Dec. 31, 1968 R. D. MOORE 3,419,196
PLASTIC PAIL WITH BAIL HAVING TWO INTERCHANGEABLE POSITIONS
Filed Oct. 19, 1967
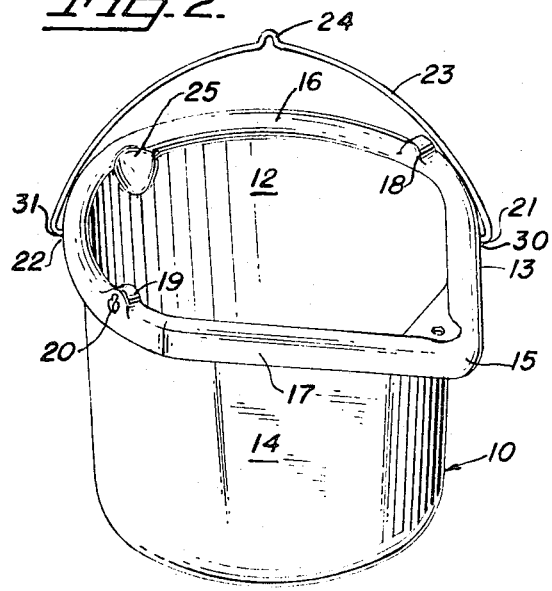
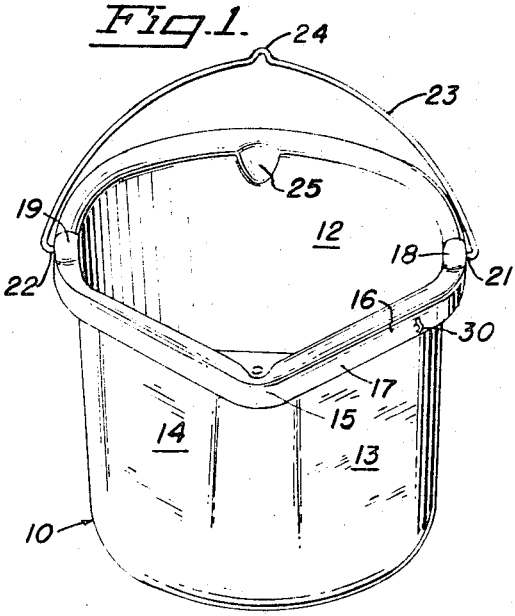
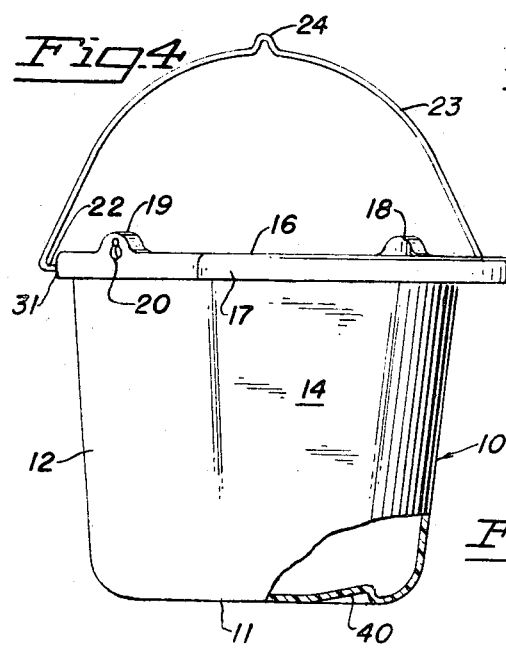
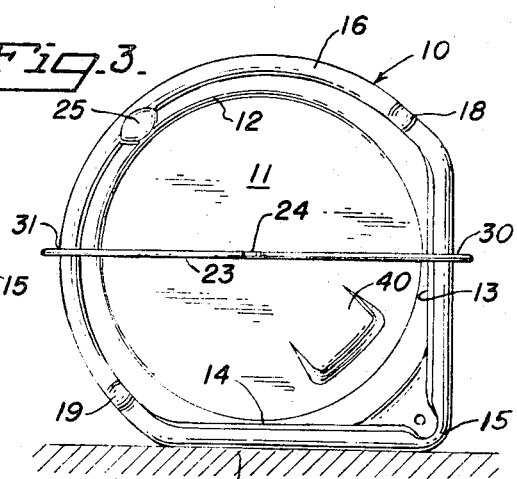
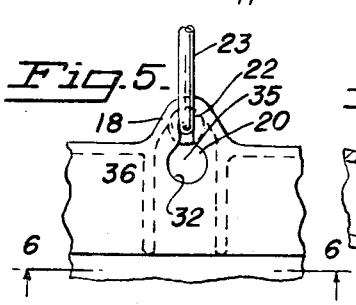
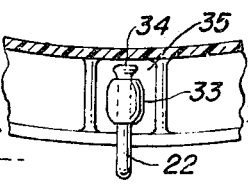
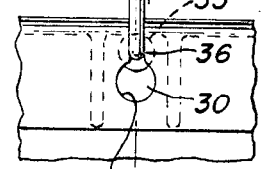
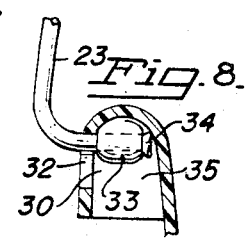
INVENTOR
ROBERT D. MOORE
BY
ATTORNEYS United States Patent Office 3,419,196
Patented Dec. 31, 1968

3,419,196
PLASTIC PAIL WITH BAIL HAVING TWO
INTERCHANGEABLE POSITIONS
Robert D. Moore, Los Angeles, Calif., assignor to
Carnation Company, Los Angeles, Calif., a corporation of Delaware
Filed Oct. 19, 1967, Ser. No. 676,468
4 Claims. (Cl. 222—465)

ABSTRACT OF THE DISCLOSURE

In a plastic pail molded to provide a bottom, a side wall, and a top rim having first bail-receiving receptacles diametrically opposite each other and dividing the pail into two halves of equal volume on opposite sides of the diameter connecting said receptacles, the side wall on one side of the diameter being generally semicircular, the side wall on the other side of the diameter defining two generally flat mutually perpendicular sides meeting at a corner, a bail with its ends rotatably mounted into the first receptacles, the new provision of a second set of bail receiving receptacles also diametrically opposite each other and so located that when the bail is held vertically it is parallel to one of the two generally flat sides, the bail being interchangeable between the two positions represented by said two sets of receptacles.

This invention relates to an improved plastic pail. It represents an improvement on the pail shown in U.S. Patent 3,329,321.

An important feature of this invention is a structure whereby the pail may have its bail mounted in two different ways. In one instance, the bail is centered properly for supporting the pail into a corner installation, as in U.S. Patent 3,329,321. However, in addition, the bail is also removable from that position and insertable in a second stable position suitable for mounting the pail on a wall parallel to the wall, that is, with one flat side of the pail parallel to a flat wall.

Other objects and advantages of the invention will become apparent from the following description of a preferred embodiment.

In the drawings:

FIG. 1 is a view in perspective of a plastic pail embodying the principles of the invention, with its bail in its position symmetrical to the corner.

FIG. 2 is another view in perspective of the pail of FIG. 1 with the bail in its position parallel to one flat wall.

FIG. 3 is a top plan view of the pail of FIGS. 1 and 2 with the bail shown in the position of the pail of FIG. 1.

FIG. 4 is a view in side elevation showing the bail as mounted from a hook for use parallel to a flat wall. A portion of the lower right-hand corner is broken away and shown in section.

FIG. 5 is a fragmentary view in side elevation of one of the bail receptacles that is used in FIG. 1, with the bail inserted therein.

FIG. 6 is a view in section taken along the line 6—6 in FIG. 5.

FIG. 7 is a view similar to FIG. 5 of one of the alternate bail openings that is used in FIG. 2, with the bail inserted thereon.

FIG. 8 is a view in section taken along the line 8—8 in FIG. 7.

The bucket or pail 10 is preferably made out of strong plastic such as polyethylene, preferably being molded in one piece without seams for durability and smoothness. The pail 10 has a generally flat bottom wall 11 and a side wall composed of two main portions; (1) a generally semicircular portion 12 and (2) two mutually perpendicular flat walls 13 and 14 which meet at a rounded corner 15. The pail has a rim 16 with a downturned lip 17, and this rim 16 is provided with two upwardly extending portions 18 and 19, on opposite sides providing two diametrically opposite receptacles 20 suitable for the reception of the ends 21 and 22 of a bail 23. The bail 23 has a central outstepped portion 24 helping in suspension from a hook or the like. The receptacles 20 are so aligned that the corner edge 15 is halfway between them, and an alternate lip 25 on the semicircular portion is midway between them and is diametrically in line with the corner 15. Also, the projections 18 and 19 and receptacles 20 are so aligned that the bail 23 then extends across the pail 10 at substantially the points where the semicircular portion 12 meets the flat portions 13 and 14.

In addition to these receptacles 20 the present invention provides another pair of receptacles 30 and 31, which are so located that when the bail 23 is inserted in them, the bail 23 (when vertical) extends parallel to the side wall 14. These receptacles 30 and 31 need not be in raised portions.

In all instances the receptacles 20, 30 and 31 themselves include an opening 32 to receive an enlarged cylindrical bearing member 33 on the bail 23. The cylindrical member 32 is added to the bail 23 and held by a turned over end 34 of the bail wire, and the rim 16 and its lip 17 provide a chamber-like enclosure 35 to receive the member 32. A slot 36 extends upwardly from the opening 32 to engage the wire portion 21 or 22 when the ball ends 21 and 22 are fully installed. Thus, the bail 23 when installed has its generally cylindrical members 33 resting in the chamber 35 against the generally horizontal, possibly somewhat curved portion of the rim 16.

Tipping of the bucket is made easier and enhanced by a formation of the bottom wall 11 with a short upwardly projecting wedge-shaped recess 40 which enables one or more fingers or one's hand to be inserted beneath the pail 10 and used to tip the pail 10 upwardly to swing it around the bail pivots 33.

The versatility of the bucket 10 is greatly increased by having the two sets of bail receptacles, both balanced, since the receptacles in each set are diametrically opposite each other. The use of the sockets 20 is known from my previous patent, but the sockets 30 and 31 are new, and the interchangeability of the bail 23 is new. The key location, where the bail 23 is parallel (when vertical) with the flat wall 14 enables the pail 10 to be held up against a flat wall 37 of a barn or stall, so that with a double snap, the pail 10 is held in a stable position for feeding or watering an animal.

To those skilled in the art to which this invention relates, many changes in construction and widely differing embodiments and applications of the invention will suggest themselves without departing from the spirit and scope of the invention.

I claim:
1. A plastic pail molded to provide a bottom, a side wall, and a top rim, said rim having first bail-receiving receptacles diametrically opposite each other and dividing said pail into two halves of equal volume on opposite sides of the diameter connecting said receptacles, the side wall on one side of said diameter being generally semicircular, the side wall on the other side of said diameter defining two generally flat mutually perpendicular sides meeting at a corner, and a bail having ends rotatably mounted into said receptacles and extending over said bucket in approximately a semicircle of about the same diameter as said rim,
    said pail being characterized by a second set of bail receiving receptacles also diametrically opposite each other and so located that when said bail is held vertically it is parallel to one of said two generally flat sides, said bail being interchangeable between the two positions represented by said two sets of receptacles.

2. The pail of claim 1 wherein said rim provides a smooth upper surface and a downturned lip, said second receptacles being in said lip.

3. The pail of claim 1 wherein said pail has a pouring spout diametrically opposite said corner and said bottom wall is provided with a wedge-shaped hand-receiving recess, on the side of center nearer said corner along the diametral line connecting the said pouring spout and said corner.

4. A plastic pail molded in one piece to provide a substantially flat bottom wall, a side wall, and a top rim, said rim having a first set of bail-receiving receptacles diametrically opposite each other with the diametral line joining them dividing said pail into two halves of equal volume, the side wall on one said half being semicircular, the side wall on the other said half defining two flat mutually perpendicular sides meeting at a corner, said rim also having a second set of receptacles diametrically opposite each other along a diametral line parallel to one of said two flat sides, and a bail having ends removably mounted rotatably in one set of said receptacles and able to be mounted in the other said set, so that it is interchangeable between two positions.

References Cited
UNITED STATES PATENTS

| | | | |
|---|---|---|---|
| 1,873,624 | 8/1932 | Moxey | 222—465 |
| 3,329,321 | 7/1967 | Moore | 222—465 |

STANLEY H. TOLBERG, *Primary Examiner.*

U.S. Cl. X.R.

119—72